June 5, 1951   R. F. MOORE   2,555,755
HIGH-PRESSURE HYDRAULIC VALVE WITH PILOT VALVE
Filed Dec. 11, 1948   3 Sheets-Sheet 3

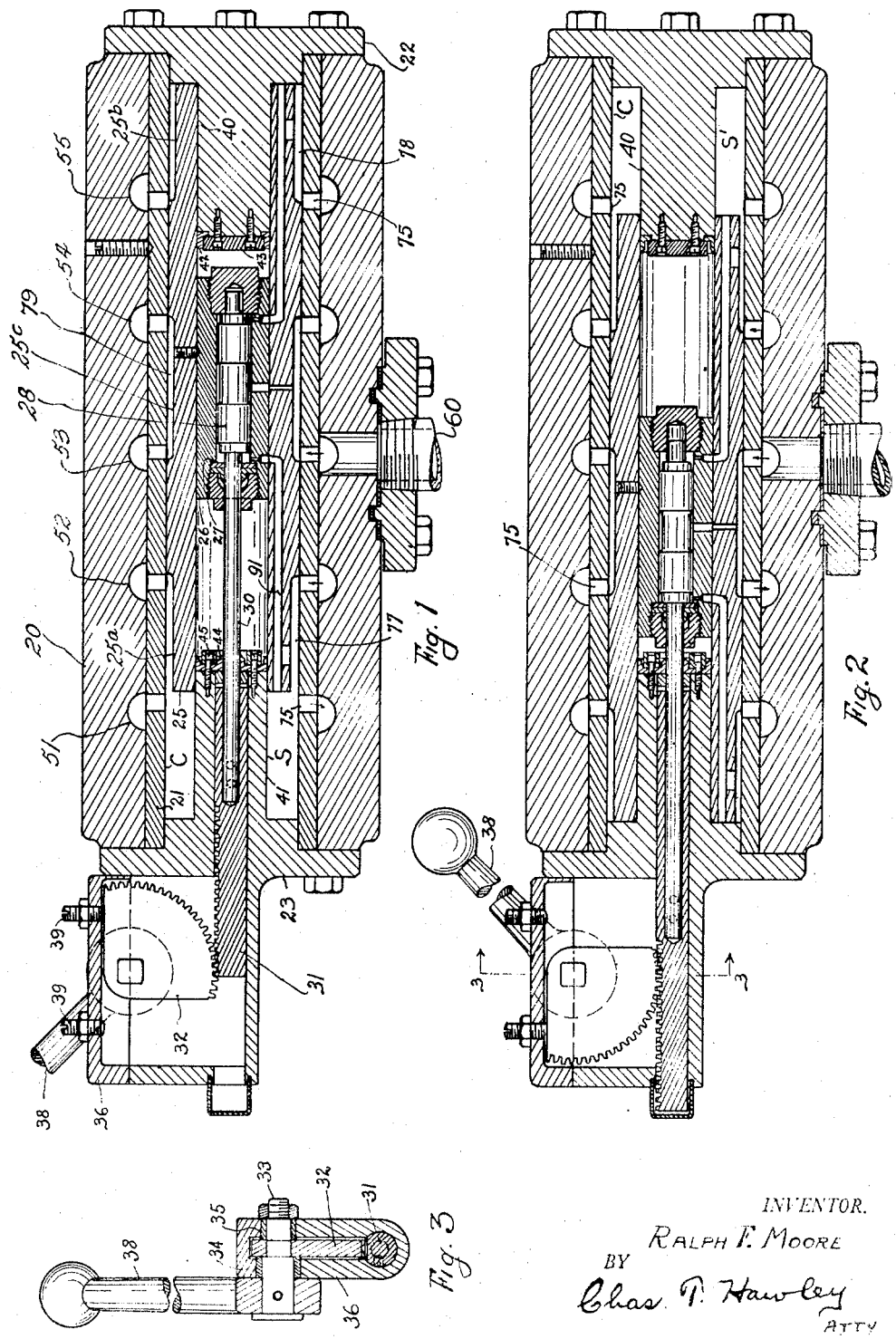

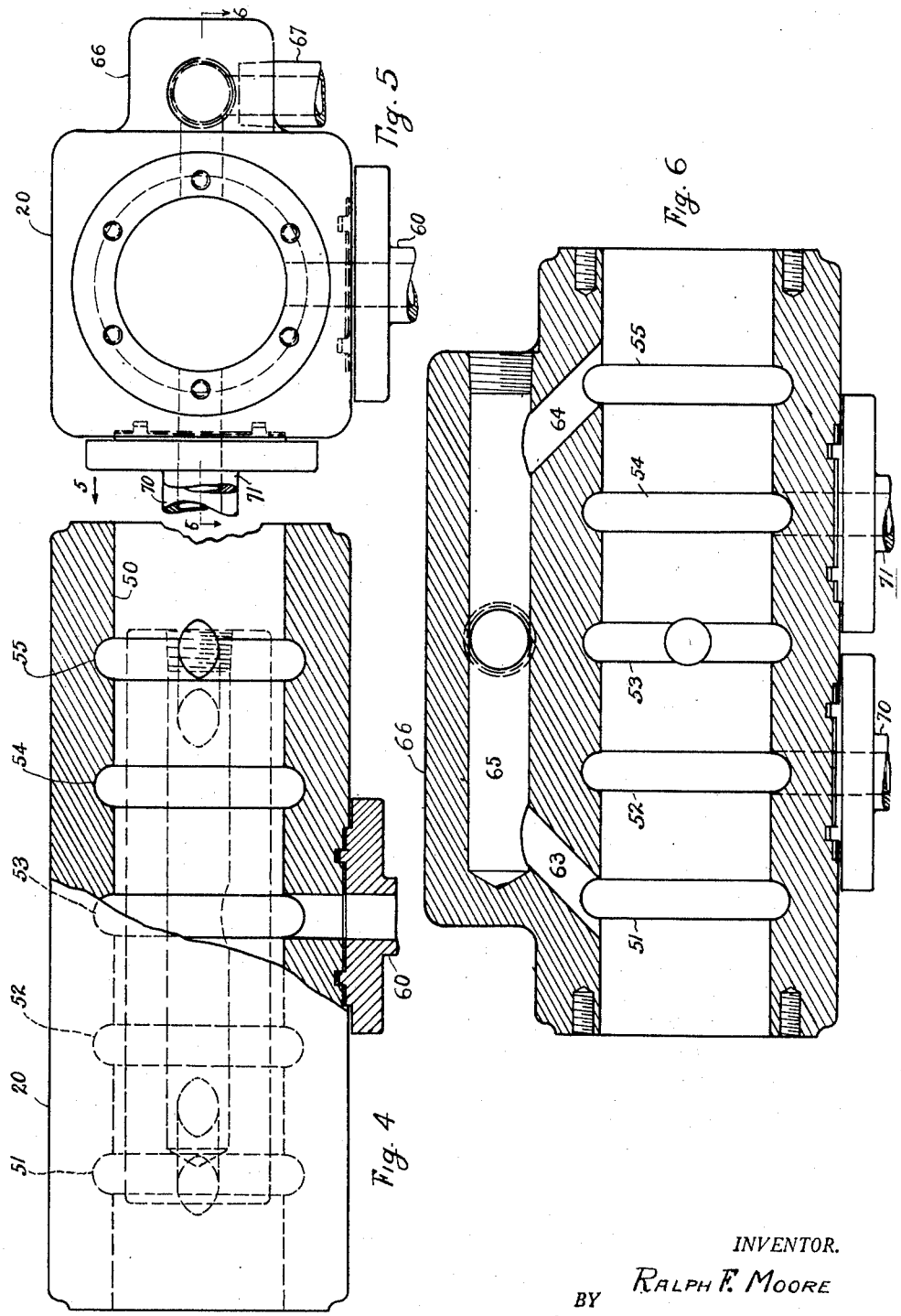

INVENTOR.
RALPH F. MOORE
BY
Chas. T. Hawley
ATT'Y.

Patented June 5, 1951

2,555,755

UNITED STATES PATENT OFFICE 2,555,755

HIGH-PRESSURE HYDRAULIC VALVE WITH PILOT VALVE

Ralph F. Moore, Shrewsbury, Mass., assignor to Wyman-Gordon Company, Worcester, Mass., a corporation of Massachusetts Application December 11, 1948, Serial No. 64,848

4 Claims. (Cl. 121—46.5)

This invention relates to hydraulic valves which are to be operated under very high pressure and which cannot be directly shifted manually.

It is the general object of this invention to provide an improved hydraulic valve construction by which the main valve is operated under the control of a pilot valve, which latter valve may be manually shifted.

A further object of the invention is to provide a hydraulic valve construction in which a main valve under heavy hydraulic pressure will be caused to promptly follow any and all movements of an associated pilot valve, and in which the movements of the main valve are preferably in the same direction and of the same amplitude as the movements of the pilot valve.

A further object is to provide a construction in which the limits of movement of the main valve in both directions are determined by the extent of movement of the pilot valve, and in which the limits of movement of the pilot valve in both directions may be separately determined.

My invention further relates to arrangements and combinations of parts which will be hereinafter set forth and more particularly pointed out in the appended claims.

A preferred form of the invention is shown in the drawings, in which

Fig. 1 is a sectional side elevation of my improved hydraulic valve;

Fig. 2 is a view similar to Fig. 1 but showing the main valve and pilot valve in different positions;

Fig. 3 is a detail view, taken substantially along the line 3—3 in Fig. 2;

Fig. 4 is a side elevation, partly in section, of the main valve body or casing;

Fig. 5 is an end view, looking in the direction of the arrow 5 in Fig. 4;

Fig. 6 is a sectional plan view, taken along the line 6—6 in Fig. 5;

Figure 8:
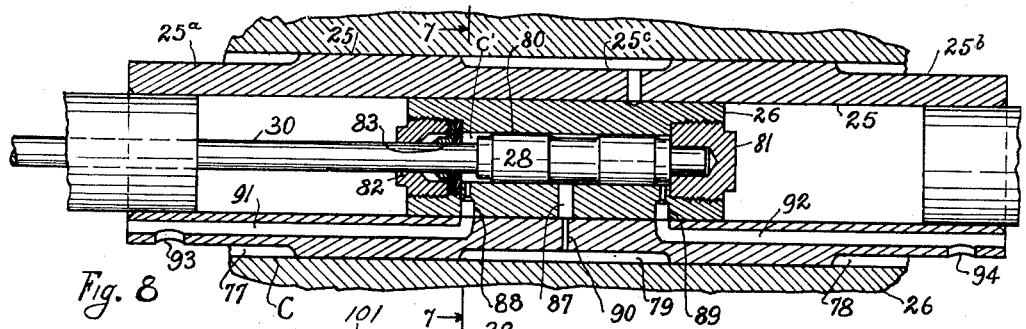
Figure 9:
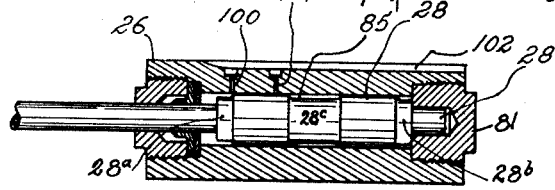
Figure 10:
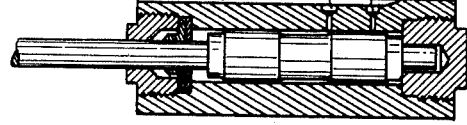
Figure 7:
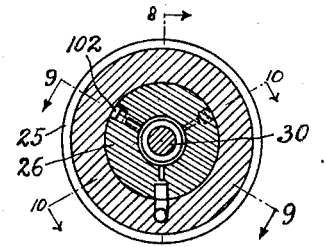
Fig. 7 is a sectional end elevation of the main and pilot valves, taken along the line 7—7 in Fig. 8.
Figure 11:
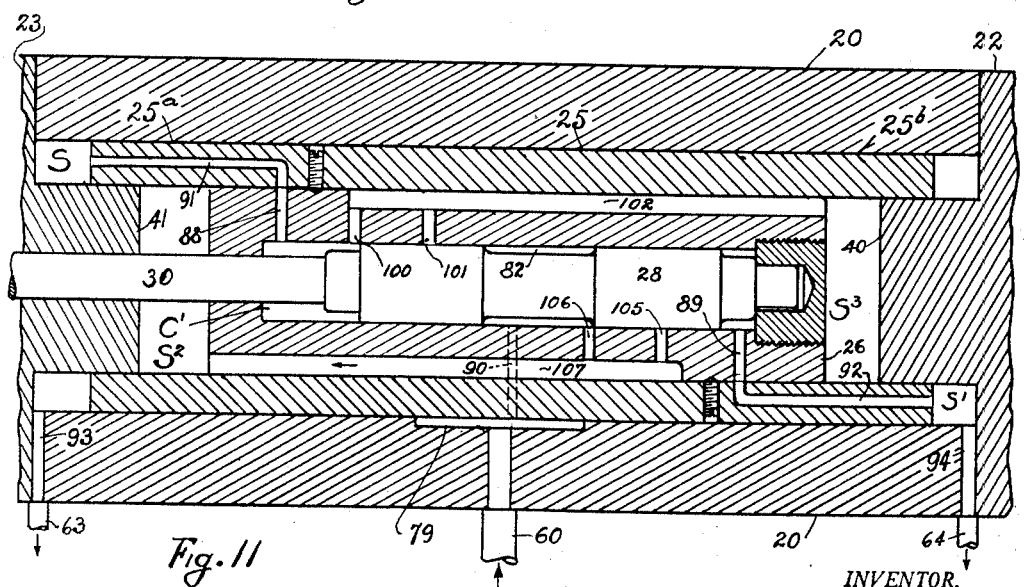

Figs. 8, 9 and 10 are longitudinal sectional views of the two valves, taken along the lines 8—8, 9—9 and 10—10 respectively in Fig. 7; and Fig. 11 is a diagrammatic view illustrating the "follow-up" movement of the main valve.

Referring to Figs. 1 and 2, my improved hydraulic valve comprises a main body or casing 20 having a cylindrical liner or sleeve 21 fixed therein and having end members 22 and 23. A main valve 25 is slidable in the cylindrical recess C in the fixed sleeve 21. The main valve 25 has a liner 26 fixed therein which has an axial passage 27 for a pilot valve 28.

The valve 28 is connected by a valve rod 30 to a rack bar 31 slidable in the end member 23 and engaged by a segmental gear 32. The gear 32 is mounted on a stud 33 (Fig. 3) rotatable in bearings 34 and 35 in an extension 36 of the end member 23. A handle 38 is mounted on the stud 33 and is provided for manual shifting of the segmental gear 32 and pilot valve 28. Stop screws 39 (Figs. 1 and 2) are engaged by the segmental gear at its limits of movement. These stop screws may be separately adjusted to vary the limit of movement in each direction.

Fixed cylindrical inward projections 40 and 41 (Figs. 1 and 2) are provided on the inner faces of the end members 22 and 23 and slidably support the end portions 25a and 25b of the main valve 25.

A cup washer 42 (Fig. 1) is secured to the inner end of the projection 40 by a disc 43 and prevents leakage between the main valve 25 and the end projections 42. A double cup washer 44 having both inner and outer flanges is secured to the extension 41 by a ring 45 and prevents leakage between the main valve 25 and the projection 41 and also around the valve rod 30.

Referring to Figs. 4, 5 and 6, the main body or casing 20 has a cylindrical axial passage 50 and is provided with series of annular channels 51, 52, 53, 54 and 55. The passage 53 is connected to a supply pipe 60, through which constant hydraulic pressure is supplied. This pressure is commonly extremely heavy and may reach or exceed 5500 lbs. per square inch.

The end channels 51 and 55 are connected by passages 63, 64 (Fig. 6) to a longitudinal passage 65 in an exhaust manifold 66 having a discharge pipe 67 (Fig. 5). The remaining channels 52 and 54 are connected to pipes 70 and 71 (Fig. 6), which in turn are connected to opposite ends of any hydraulic mechanism to be controlled or operated by the hydraulic valve herein described. The main casing liner 21 (Fig. 1) defines the cylinder C and is provided with successive annular series of ports 75 which communicate with the annular channels 51 to 55 above described.

The main valve 25 (Fig. 8) is slidable in the cylinder C and is a free sliding fit therein. Limited hydraulic leakage past the valve 25 is considered desirable, as a certain amount of circulation through the very high pressure pump which supplies the hydraulic liquid is necessary to avoid overheating.

The main valve 25 has reduced end portions 25a and 25b and a reduced middle portion 25c. Annular passages 77, 78 and 79 (Fig. 1) are thus provided between the valve 25 and the liner 21 and these passages communicate in varying combinations with the ports or channels 51 to 55 previously described.

The detailed construction of the main and pilot valves is best shown in Figs. 7 to 11. The liner 26 of the main valve 25 has an axial opening or passage 80 in which the pilot valve 28 is freely slidable. The passage 80 is closed at one end by a plug 81 and at the opposite end by a bushing 82 having suitable packing 83 for the pilot valve rod 30.

The plug 81 and bushing 82 enclose a chamber C' in which the pilot valve 28 is freely slidable. The valve 28 has reduced end portions 28a and 28b (Fig. 9) and a reduced middle portion 28c which provides an annular channel 83. The valve 28 also has an extension 28d slidable in a bearing opening in the plug 81.

The main valve liner 26 has ports in three different planes, as indicated in Figs. 7 to 10. In plane 8—8, the liner 26 has ports 87, 88 and 89 (Fig. 8). The port 87 communicates through a restricted opening 90 in the main valve 25 with the annular passage 79 between the main valve and the wall of the cylinder C. The port 88 connects through an open longitudinal passage 91 (Fig. 1) in the valve 25 to a space S at the left-hand end of the cylinder C, and the port 89 connects through a corresponding open longitudinal passage 92 (Fig. 2) to a space S' at the opposite end of the valve cylinder C.

Ports 93 and 94 (Fig. 8) continuously connect these longitudinal passages with the annular passages 77 and 78 which surround the extension 25a and 25b of the main valve 25, and these annular passages are continuously connected to the exhaust through the annular passages 51 and 55 and through the connections 63 and 64 to the exhaust manifold.

The valve liner 26 (Fig. 9) is also provided with ports 100 and 101 which are in the plane of the section line 9—9 of Fig. 7. These ports connect into a channel or keyway 102 in the liner 26 which is open at its right-hand end as shown in Fig. 9.

In the plane 10—10 of Fig. 7, the liner 26 has ports 105 and 106 (Fig. 10) which communicate with a groove or keyway 107 which is open at the left-hand end of the liner 26.

The ports 100 and 105 act as exhaust ports for the channels 102 and 107 respectively under certain operating conditions, and the ports 101 and 106 act as pressure ports.

The operation of my improved hydraulic valve will now be described, with particular reference to diagrammatic Fig. 11 in which the various ports and passages are transferred to a common plane. It is assumed in Fig. 11 that the pilot valve 28 has been moved to the right in the main valve chamber C' far enough to open the ports 100 and 106. Hydraulic pressure will then be applied through the pipe 60, annular passage 79 and restricted opening 90 to the annular passage 82, and thence through the port 106 and channel 107 to the space S2 at the left of the main valve 25. Pressure is thus exerted between the valve 25 and the fixed casing projection 41, and the valve 25 will be moved to the right until the port 106 is again covered by the valve 28.

During such movement of the valve 25, the space S3 at the right-hand end of the valve 25 is connected through the channel 102 and port 100 to the left-hand end of the valve chamber C' and thence through the passages 88 and 91 to the space S, which in turn is connected through a passage 93 to an exhaust pipe 63. The space S3 is thus vented.

The port 100 is opened and closed simultaneously with the port 106, and the main valve is brought to rest as soon as both of these ports are covered by movement of the valve 25 to the right. Further movement of the pilot valve in the same direction will cause further movement of the main valve to the right, and movement of the pilot valve to the left to uncover the ports 101 and 105 will cause corresponding movement of the main valve to the left and discharge of liquid from the space S2 through the channel 107, port 105, passages 89 and 92, vent 94 and exhaust connection 64.

It is thus seen that every movement of the pilot valve 28, whether manually or automatically produced, will be followed immediately by a corresponding movement of the main valve 25 in the same direction and to the same extent. As soon as such movement is completed, the main valve will be locked by the closing of both ports 100 and 105 and cannot be thereafter displaced except in response to further movement of the pilot valve.

It will also be noted that both end portions of the pilot valve chamber C' are at all times connected through the passages 91 and 92 to the spaces S and S' which in turn are at all times connected to exhaust. Consequently, the pressures on the pilot valve 82 are at all times balanced and the pilot valve is freely movable, regardless of the heavy pressure controlled thereby.

Having thus described my invention and the advantages thereof, I do not wish to be limited to the details herein disclosed, otherwise than as set forth in the claims, but what I claim is:

1. A hydraulic valve mechanism comprising a casing having a valve chamber therein provided with hydraulic pressure and exhaust connections, a main valve slidable in said chamber and having a closed passage therein, a pilot valve slidable in said closed passage in said main valve, means to continuously vent both ends of said closed passage to the exhaust connection of said main valve, selective means to move said pilot valve freely in either direction, and hydraulic connections controlled by said pilot valve and effective to admit liquid under pressure to the associated end of said main valve chamber and to thereby move said main valve in said chamber in a predetermined direction and to a predetermined extent.

2. The combination in a hydraulic valve mechanism as set forth in claim 1, in which the pilot valve has end closure portions separated by a reduced portion defining a space continuously under pressure.

3. The combination in a hydraulic valve mechanism as set forth in claim 1, in which the pilot valve has end closure portions separated by a reduced portion defining a space continuously under pressure and in which said closure portions control ports effective to connect a selected end of the main valve chamber to the hydraulic pressure connection and the other end to the exhaust connection.

4. A hydraulic valve mechanism comprising a casing having a valve chamber therein provided with hydraulic pressure and exhaust connections, a main piston valve slidable in said chamber and having a closed axial passage therein, a pilot piston valve slidable in said closed axial passage in said main valve, means to continuously vent both ends of said closed passage to the exhaust connection of said main valve, selective means to move said pilot valve freely in either direction, and hydraulic connections controlled by said pilot valve and effective to admit liquid under pressure to the indicated end of said chamber and to move said main valve in said chamber in the same direction and to the same extent as said pilot valve has been moved.

RALPH F. MOORE.

REFERENCES CITED

The following references are of record in the file of this patent:

UNITED STATES PATENTS

| Number | Name | Date |
| --- | --- | --- |
| 151,667 | Loretz | June 2, 1874 |
| 929,206 | Gelpke | July 27, 1909 |
| 1,119,640 | Roettger | Dec. 1, 1914 |
| 1,125,825 | Englesson | Jan. 19, 1915 |
| 1,743,732 | Seewer | Jan. 14, 1930 |
| 2,455,315 | Rose | Nov. 30, 1948 |